(12) United States Patent
Calvet et al.

(10) Patent No.: US 8,488,260 B2
(45) Date of Patent: Jul. 16, 2013

(54) PLANAR FLEXURE SYSTEM WITH HIGH PITCH STIFFNESS

(75) Inventors: Robert J. Calvet, Pasadena, CA (US); Xiaolei Liu, Los Angeles, CA (US); Ankur Jain, Arcardia, CA (US)

(73) Assignee: DigitalOptics Corporation MEMS, Arcadia, CA (US)

( * ) Notice: Subject to any disclaimer, the term of this patent is extended or adjusted under 35 U.S.C. 154(b) by 205 days.

(21) Appl. No.: 13/171,291

(22) Filed: Jun. 28, 2011

(65) Prior Publication Data

US 2011/0255182 A1 Oct. 20, 2011

Related U.S. Application Data

(60) Division of application No. 12/273,830, filed on Nov. 19, 2008, now Pat. No. 7,990,628, which is a continuation of application No. 12/201,676, filed on Aug. 29, 2008, now abandoned.

(60) Provisional application No. 60/968,711, filed on Aug. 29, 2007.

(51) Int. Cl.
*G02B 7/02* (2006.01)

(52) U.S. Cl.
USPC .......................................................... 359/811

(58) Field of Classification Search
USPC .......................................................... 359/811
See application file for complete search history.

(56) References Cited

U.S. PATENT DOCUMENTS

2006/0181748 A1* 8/2006 Makii et al. .................. 358/500

* cited by examiner

*Primary Examiner* — Joseph P Martinez
(74) *Attorney, Agent, or Firm* — Haynes and Boone, LLP

(57) ABSTRACT

A flexure system for miniature camera and the like is disclosed. The flexure system can include a frame and a stage that is configured to move with respect to the frame. One or more flexures can interconnect the frame and the stage. Each flexure can have one or more film hinges formed thereon. The film hinges can be widely spaced and/or extended in length so as to substantially mitigate undesirable pitching of the stage.

20 Claims, 4 Drawing Sheets

PLANAR FLEXURE SYSTEM WITH HIGH PITCH STIFFNESS

PRIORITY CLAIM

This patent application is a divisional application of U.S. patent application Ser. No. 12/273,830, filed Nov. 19, 2008, which in turn is a continuation application of U.S. patent application Ser. No. 12/201,676, filed on Aug. 29, 2008, which claims the benefit of U.S. Provisional Application No. 60/968,711, filed on Aug. 29, 2007. The contents of the parent patent applications are expressly incorporated by reference in their entirety.

TECHNICAL FIELD

The present invention relates generally to micro electromechanical systems (MEMS). The present invention relates more particularly, for example, to a planar flexure system having high pitch stiffness that is suitable for used in miniature cameras and the like.

BACKGROUND

Flexures for use in micro electromechanical system (MEMS) are known. Such flexures typically allow movement in one direction while inhibiting movement in other directions or about selected axes. Thus, such flexures can facilitate the controlled movement of one structure or device relative to another structure or device.

BRIEF SUMMARY

Methods and systems for mitigating undesirable pitch in components of miniature cameras and the like are disclosed herein. For example, in accordance with an an embodiment one or more film hinges can be used to mitigate the undesirable pitch of optical components.

According to an example of an embodiment, a flexure system for a miniature camera or the like can comprise at least one film hinge. A film hinge can be formed from a substantially rigid material by making the material sufficiently thin such that desired motion is facilitated.

According to an example of an embodiment, a flexure system for a miniature camera can comprise at least one film hinge, a frame, a stage, and means for interconnecting the frame and the stage. The means for interconnecting the frame and the stage can include the film hinge(s).

According to an example of an embodiment, a method for making a flexure system can comprise using MEMS manufacturing techniques. The MEMS manufacturing techniques can be used to form at least one film hinge of the flexure system.

According to an example of an embodiment, a method for moving a stage can comprise inhibiting pitching of the stage using at least one film hinge. The film hinge can define a portion of a flexure that controls the motion of the stage.

According to an example of an embodiment, a method for focusing a camera can comprise moving a stage having a lens attached thereto. The lens can facilitate focusing, zooming, image stabilization, or any other function of the camera. Pitching of the stage can be inhibited by at least one film hinge.

In accordance with another embodiment, a method is disclosed that includes: providing a stage mechanically coupled to a frame by a plurality of film hinge flexures, wherein the stage, frame, and film hinge flexures are co-planar, and wherein the stage and frame have a first thickness and the film hinge flexures have a second thickness that is less than the first thickness; and actuating the stage out-of-plane with respect to the frame by flexing the film hinge flexures, wherein each film hinge flexure is spaced apart from the remaining film hinge flexures so as to inhibit pitching of the actuated stage with respect to the frame.

In accordance with yet another embodiment, a method is disclosed that includes: providing a stage and a frame mechanically coupled through a connecting member, wherein a proximal end of the connecting member includes a first film hinge and wherein a distal end of connecting member includes a second film hinge connected to the stage, and wherein the stage includes a linearizing flexure connected to the first film hinge; actuating the stage out-of-plane with respect to the frame by flexing the first and second film hinges; and while the stage is actuating, bowing the linearizing flexure with respect to the frame to accommodate an out-of-plane movement of the stage.

Benefits include reduced costs and increased yield in the production of MEMS devices, such as miniature cameras.

Embodiments of the present invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
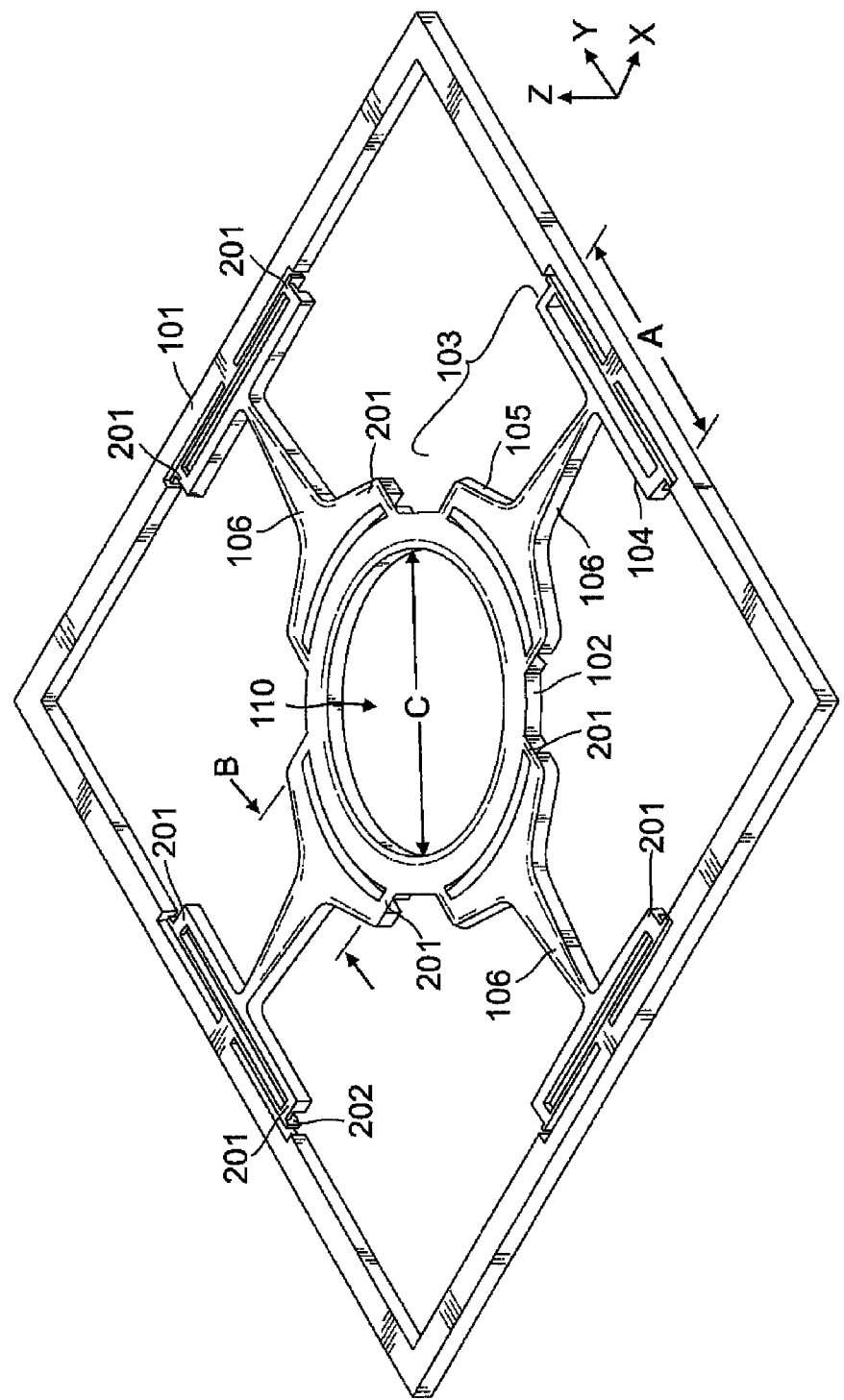
FIG. 1 is a semi-schematic perspective view of a planar flexure assembly having film hinges, according to an example of an embodiment.

A method and system for providing a two-dimensional, i.e., planar, flexure assembly for use in miniature cameras (such as those of cellular telephones) and the like is disclosed. The flexure assembly can substantially mitigate undesirable pitching of components, such as optical elements.

As those skilled in the art will appreciate, undesirable pitching of a component results in a misalignment thereof. For example, pitching of a camera lens results in misalignment of the optical axis of the lens with respect to the optical axis of the camera within which the lens is used. Such misalignment can result in a degradation of the performance of the camera. For example, images obtained with the camera can have poor focus and resolution. Undesirable pitching can also result in pre-mature wear and/or damage to components.

According to an example of an embodiment, the flexure system can comprise thin film hinges. More particularly, a system of generally coplanar flexures having thin film hinges can provide motion control for the optical elements, e.g., lens, lens assembly, mirror, prism, filter, and/or imaging sensor, of a miniature camera.

For example, the flexure system can readily facilitate desired motion along the z axis, i.e., in an out-of plane direction, of approximately 150 microns. This motion can be used to focus a lens, for example. The flexure system can have a very low spring rate, e.g., approximately 15 N/m, for motion along the z axis and very high spring rates, e.g., approximately 70,000 N/m or 1500 mN-mm/R in all other directions, for example. Contemporary simple planar flexure systems have very poor pitch stiffnesses which are typically a factor of 1000 less than is desired for miniature camera applications.

The high in-plane and pitch stiffnesses mitigate the undesirable occurrence of snap-in that is associated with electrostatic actuation. When power is applied to an electrostatic actuator to move it out of plane, large in-plane forces also develop. If these forces are not resisted by high in-plane stiffness and pitch stiffness, the two portions of the actuator at differing potentials could translate together in-plane (snap in), and create an electrical short.

An example of an embodiment can comprise thin film hinges. For example, either widely separated pairs of film hinges or single hinges having a comparatively larger lateral extent, can be used. Any desired combination of such widely separated pairs of film hinges and extended hinges can be used. In any instance, the hinges can interconnect a substantially rigid stationary frame with a moving member, such as a stage.

Each flexure of the assembly can be soft for motion along z axis and can be very rigid in twist or rotation about its own length. Three or more of these flexures oriented radially, such as from an outer frame, can attach to an inner stage. The stage can define a lens mount ring. In this manner, a flexure system that is soft in the z direction and that is very stiff in all other degrees of freedom can be provided to facilitate focusing of a camera, for example.

According to an example of an embodiment, desirable motion control can be provided using a flexure assembly that is substantially planar in configuration. Alternatively, the flexure assembly can have non-planar portions or components and can even be substantially non-planar. Planar configuration facilitates fabrication from a silicon wafer utilizing contemporary MEMS processing techniques, for example.

According to an example of an embodiment, a flexure system for a miniature camera can comprise one or more film hinges. The flexure system can comprise a frame, a stage, and at least one flexure interconnecting the frame and the stage. At least one film hinge can attach the flexure(s) to the frame. Similarly, at least one film hinge can attach the flexure(s) to the stage.

One or more film hinges can be disposed upon each end of flexure(s). The film hinges can connect the flexures to the frame and/or the stage. For example, either a pair of widely spaced film hinges or a single extended film hinge can be disposed upon each end of a flexure so as to connect the flexure to the frame and the stage.

When a pair of widely spaced film hinges is used, the two film hinges can be separated by a distance that is sufficient so as to substantially inhibit pitching of the stage. When a single extended film hinge is used, the single hinge can have an extent or length that is sufficient so as to substantially inhibit pitching of the stage. A single extended film hinge can, at least in some instances, be somewhat analogous to a pair of widely spaced film hinges having a continuous hinge formed between the two hinges.

Various configurations of hinges are suitable for use according to examples of embodiments. Various combinations of widely spaced hinges and continuous hinges are suitable for such use. Generally, the overall length of the hinge or hinges determine the ability thereof to inhibit pitching.

Thus, two film hinges can be separated by a distance that is sufficient so as to substantially inhibit pitching of the stage. For example, the two film hinges can be separated by a distance that is greater than one half of a diameter of the stage. The two film hinges can be separated by a distance that is approximately equal to a diameter of the stage. The two film hinges can be separated by a distance that is greater than a diameter of the stage.

Similarly, a single film extended hinge can have a length that is sufficient so as to substantially inhibit pitching of the stage. For example, the length of the single extended hinge can be greater than one half of a diameter of the stage. The length of the single extended hinge can be approximately equal to a diameter of the stage. The length of the single extended hinge can be greater than a diameter of the stage.

The frame can be generally square. The frame can be generally square and one flexure can extend from each side of the frame inwardly to the stage. As discussed below, the frame can be of any other desired shape. Any desired number of flexures can extend from one side of the frame to the stage.

The frame can be defined by a housing or package. For example, the frame can be defined by a camera housing. As a further example, the frame can be defined by a cellular telephone housing.

The stage can define a lens mount. The lens mount can be disposed generally centrally within the frame. The stage can be located non-centrally with respect to the frame. The stage can be either co-planar with respect to the frame or can be non-co-planar with respect thereto.

The frame can be substantially rigid. The flexures can be substantially rigid. The stage can be substantially rigid.

The film hinges can be configured to provide out-of-plane movement of the stage. Such out-of-plane movement can be used to focus a camera, zoom a camera, facilitate image stabilization for a camera, or for any other desired purpose.

As discussed above, the spring rate for out-of-plane movement can be comparatively very low and the spring rate for in-plane movement is comparatively very high. For example, the spring rate for out-of-plane movement can be approximately 15 N/m and the spring rate for in-plane movement is approximately 70,000 N/m.

The flexures can extend generally radially from the frame to the stage. The flexures do not have to extend directly from the frame to the stage. For example, the flexures can follow a tortuous or contorted path from the frame to the stage.

The flexures can be spaced at approximately equal angles about the stage. Alternatively, the flexures can be spaced at unequal angles about the stage.

As discussed herein, the frame, stage, flexures, and film hinges can be substantially monolithic in construction. For example, the frame, stage, flexures, and film hinges can be formed monolithically from silicon. The frame, stage, flexures, and film hinges can be formed monolithically from a single silicon wafer using MEMS manufacturing techniques.

Thus, four flexures can connect to the central moving portion or stage and extend radially outward and connect to the frame. Three, instead of four flexures, can alternatively be used. Any desired number of flexures can be used. It is not necessary to dispose the flexures evenly about the central moving portion or stage, although this can be done. The usage of three or more flexures provides the moving portion with low Z stiffness, for allowed motion, and high stiffness in all other degrees of freedom (X, Y, θX, θY, θZ).

Referring now to FIG. 1, an example of an embodiment can comprise a generally planar flexure assembly having with high pitch stiffness. The high pitch stiffness can inhibit undesirable pitching, as discussed below.

A substantially rigid frame 101 can be attached to a stage 102 via one or more flexures 103. The substantially rigid frame 101, stage 102, and the flexures 103 can be formed substantially integrally with one another, such as from a single, monolithic piece of silicon, e.g., a wafer.

The frame 101 can be generally square in configuration. Alternatively, the frame 101 can have any other desired shape. For example, the frame can be triangular, rectangular, pentagonal, octagonal, round, or oval in configuration.

The frame 101 can be any shape that rigidly connects the thin-film hinges to one another. For example, the frame 101 can define a window frame, e.g., hollow square, rectangle, or trapezoid.

Similarly, the stage 102 can be generally round in configuration. For example, the stage 102 can be generally round so as to better facilitate the mounting of a lens or lens assembly thereto. Alternatively, the stage 102 can have any other desired shape. For example, the stage 102 can be triangular, square, rectangular, pentagonal, octagonal, round, or oval in configuration. As those skilled in the art will appreciate, a non-round stage can readily accommodate a round lens or lens assembly.

The stage 102 can have an opening 110 formed therein. The opening 110 can be formed generally centrally within the stage 102. The opening 110 can have the same general shape as the stage 102. Alternatively, the opening 110 can have a different shape with respect to the shape of the stage and the opening 110 need not be formed generally centrally within the stage 102.

Any desired number of flexures 103 can be used. For example, 1, 2, 3, 4, 5, 6, or more flexures can be used. The number of flexures can correspond to the number of sides of the frame 101. For example, a triangular frame can have three flexures and a square or rectangular fame can have four flexures. Not all sides of a frame necessarily require a corresponding flexure.

Figure 2:
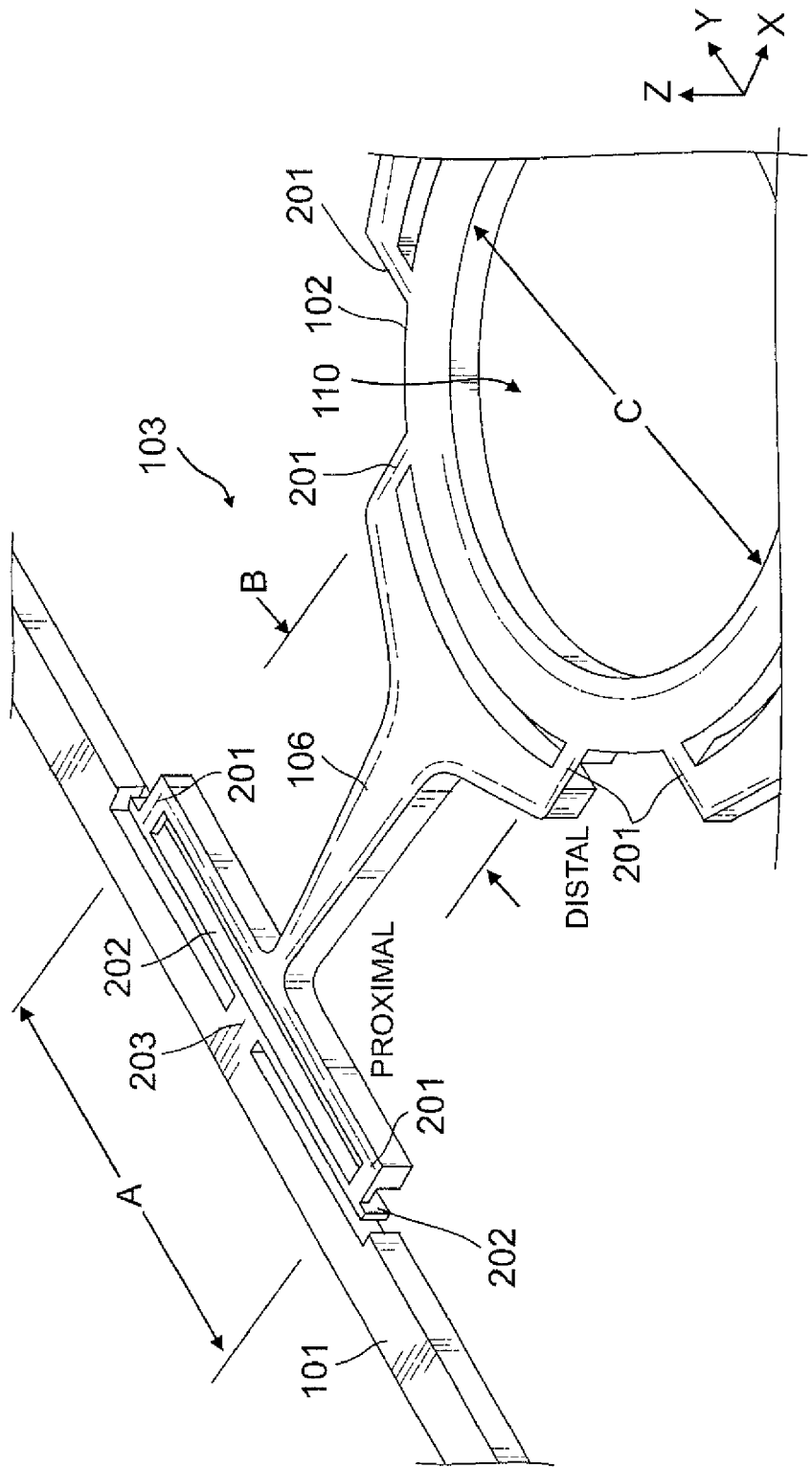
FIG. 2 is a semi-schematic enlarged perspective view of a planar flexure, including the film hinges thereof, of a planar flexure assembly, according to an example of an embodiment.

Referring now to FIG. 2, an example of an embodiment a flexure 103 can comprise one or more hinges 201 at each end thereof. The hinges 201 can be configured so as to inhibit pitching of the stage 102 (and consequently of the optical element(s) disposed thereon). In this manner, undesirable misalignment of an optical element can be mitigated.

More particularly, a flexure 103 can comprise an interconnecting member 106, which can be defined by a radially extending and elongated portion of the flexure 103. The interconnecting member can have two widely spaced film hinges 201 formed at a proximal end thereof and can have two widely spaces film hinges 201 formed at a distal end thereof. The film hinges 201 at the proximal end of the interconnecting member 106 can attach the interconnecting member 106 to the frame 101. The film hinges 201 at the distal end of the interconnecting member 106 can attach the interconnecting portion 106 to the stage 102.

The widely separated hinges 102 can comprise at least two hinges wherein the two hinges that are the farthest apart are sufficiently far apart so as to substantially inhibit pitching of the stage 102. For example, the distance, Dimensions A and B, between the two hinges 201 that are the farthest apart can be greater than one half of the diameter, Dimension C, of the opening 110 in the stage 102. As a further example, the distance, Dimensions A and B, between the two hinges 201 that are the farthest apart can be approximately equal to the diameter, Dimension C, of the opening 110 in the stage 102.

The distance, Dimension A, between the two hinges 201 at the proximal end 104 of the interconnecting member 106 can be different from the distance, Dimension B, between the two hinges 201 at the distal end 105 of the interconnecting member 106.

Local twist stiffness is provided by the separation between the pair of hinges at each end, or by the lateral extent of a single hinge. This local twist stiffness inhibits undesirable pitching of the stage 102.

As discussed herein, rather than two widely spaced hinges 201, a single extended hinge can be used. Any desired number of hinges and/or configuration of hinges that mitigates undesirable pitching can be used.

The above described configuration of hinges and frame, by itself, can be undesirably non-linear. That is, the stiffness in the Z direction increases with increasing Z deflection. The cause of the nonlinearity is mid-plane stretching. The flexure needs to become longer as Z deflection increases, and the flexure is comparatively stiff axially and resists extension.

According to an example of an embodiment, a pair of linearizing flexures 202 can be placed between the frame side hinges 201 and the frame 101. This pair of linearizing flexures 202 can be substantially stiff in Z, tangentially (perpendicular to the radial direction, which also means perpendicular to the axial direction of the flexure), and in twist about the flexure axis.

The linearizing flexures 202 can be elongated members that bow so as to accommodate out-of-plane movement of the stage 102. The linearizing flexures 202 effectively increase the length of the flexure assembly 103 as the out-of-plane movement of the stage 102 increases (as the stage 102 moves further along the z axis).

The high pitch stiffness can inhibit rotation about the x axis and the y axis. The use of pairs of hinges (as shown) or elongated hinges for a flexure inhibits pitching or twisting about the longitudinal axis of that flexure.

Figure 3:
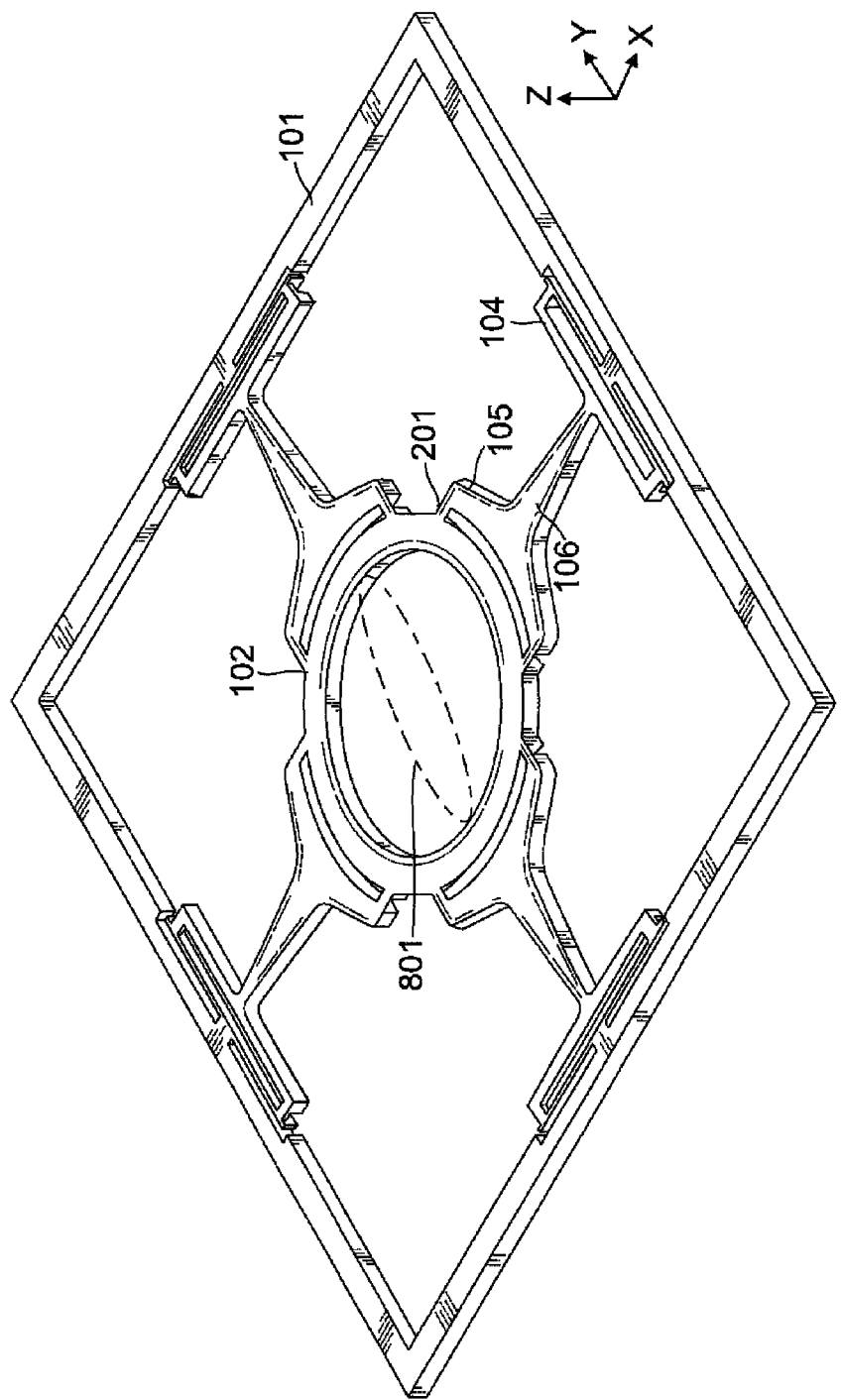
FIG. 3 is a semi-schematic top view of a planar flexure assembly with film hinges having a lens attached to the stage thereof, according to an example of an embodiment.

Referring now to FIGS. 3, an optical element 801, such lens, lens assembly, mirror, prism, filter, and/or imaging sensor can be attached to the stage 102. Any desired device or item (including non-optical elements) can be mounted to or otherwise in mechanical communication with the stage 102 so as to effect movement of the device.

The optical element(s) can be held in position via a mount or can attach directly to the stage 102. Any desired method for mounting an optical element or other device or item to the stage can be used.

Figure 4:
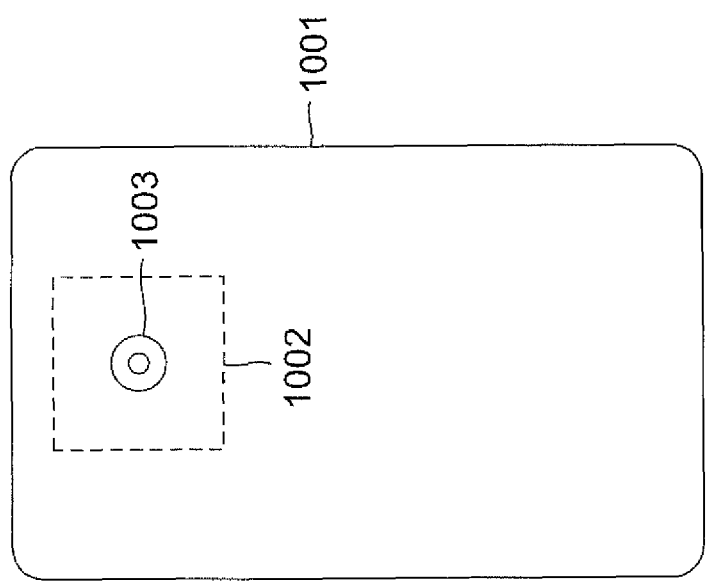
FIG. 4 is a semi-schematic front view of a personal electronic device, such as a cellular telephone, comprising a camera having a flexure assembly, according to an example of an embodiment.

For example, optical element 801 can be a lens assembly for a miniature camera, such as a miniature camera for a cellular telephone (such as cellular telephone 1001 of FIG. 4). Thus, the stage 102 can move along the z axis (in and out of the plane of the paper) so as to effect focusing of the camera, for example. Movement of the stage 102 can effect focusing, zooming, image stabilization, or any other desired function. An actuator or motor can be used to effect such movement of the stage 102. The actuator or motor can be either a MEMS actuator or motor or a non-MEMS actuator or motor.

Referring now to FIG. 4, a camera 1002 can be made according to an example of an embodiment. The camera 1002 can have a flexure assembly for facilitating focusing, zooming, and or image stabilization thereof can be built into a cellular telephone 1001, according to an example of an embodiment. The use of MEMS deployment flexures can better facilitate miniaturization and construction of such a camera. The cost of the camera can be substantially reduced and the reliability thereof can be enhanced.

As used herein, the term "pitch" can refer to rotation about any axis that is contained within the plane of the flexure assembly. For example, pitch can refer to rotation about the x axis or the y axis as shown in the figures.

As used herein, the term "film" can refer to a portion of a structure that is thinner than other portions thereof (such as immediately adjacent portions) such that the film defines a hinge, like a living hinge. The hinge can facilitate relative movement of structures that are adjacent to the hinge (such as rotation of one structure relative to the other structure).

As used herein, the term "housing" can refer to any package, container, product, device, or structure within which and/or to which a flexure assembly can be contained and/or attached.

As used herein, the term "diameter" can refer to a major dimension of a structure that provides some indication of the size thereof. Thus, the term diameter is not restricted to the characterization of circles.

One or more embodiments facilitate the construction of devices such as miniature cameras at reduced cost and with increased yield. Improved operation and reliability can be provided.

Embodiments described above illustrate, but do not limit, the invention. It should also be understood that numerous modifications and variations are possible in accordance with the principles of the present invention. Accordingly, the scope of the invention is defined only by the following claims.

We claim:

1. A method comprising:
    providing a stage mechanically coupled to a frame by a plurality of film hinge flexures, wherein the stage, frame, and film hinge flexures are co-planar, and wherein the stage and frame have a first thickness and the film hinge flexures have a second thickness that is less than the first thickness; and
    actuating the stage out-of-plane with respect to the frame by flexing the film hinge flexures, wherein each film hinge flexure is spaced apart from the remaining film hinge flexures so as to inhibit pitching of the actuated stage with respect to the frame.

2. The method of claim 1, wherein the stage further comprises a lens for a camera, the method further comprising focusing the camera through the actuation.

3. The method of claim 1, wherein the stage further comprises a lens for a camera, the method further comprising image stabilizing the camera through the actuation.

4. The method of claim 1, wherein stage further comprises a lens for a camera, the method further comprising zooming the camera through the actuation.

5. The method of claim 1, wherein stage is circular and wherein each film hinge flexure is spaced apart from the remaining film hinge flexures by at least one half a diameter of the circular stage.

6. The method of claim 1, wherein the actuation is an electrostatic actuation, and wherein the pitch inhibiting mitigates an occurrence of snap-in associated with the electrostatic actuation.

7. The method of claim 1, further comprising:
    forming the frame, stage, and the plurality of film hinge flexures using MEMS manufacturing techniques.

8. The method of claim 7, wherein the frame, stage, and the plurality of film hinge flexures are formed from a silicon wafer.

9. A method, comprising:
    providing a stage and a frame mechanically coupled through a connecting member, wherein a proximal end of the connecting member includes a first film hinge and wherein a distal end of connecting member includes a second film hinge connected to the stage, and wherein the stage includes a linearizing flexure connected to the first film hinge;
    actuating the stage out-of-plane with respect to the frame by flexing the first and second film hinges; and
    while the stage is actuating, bowing the linearizing flexure with respect to the frame to accommodate an out-of-plane movement of the stage.

10. The method of claim 9, wherein the stage further comprises a lens for a camera, the method further comprising focusing the camera through the actuation.

11. The method of claim 9, wherein the stage further comprises a lens for a camera, the method further comprising image stabilizing the camera through the actuation.

12. The method of claim 9, wherein stage further comprises a lens for a camera, the method further comprising zooming the camera through the actuation.

13. The method of claim 9, wherein the stage, frame, and film hinge are co-planar, and wherein the stage and frame have a first thickness and the film hinge has a second thickness that is less than the first thickness.

14. The method of claim 9, wherein the linearizing flexure is an elongated member.

15. The method of claim 9, further comprising inhibiting a pitching of the actuated stage with respect to the frame using the film hinge.

16. The method of claim 15, wherein the inhibition of pitching further uses the linearizing flexure.

17. The method of claim 9, wherein the frame, stage, and film hinge comprise silicon.

18. The method of claim 17, wherein the silicon comprises a silicon wafer.

19. The method of claim 17, wherein the frame, stage, and film hinge comprise a microelectronic mechanical device.

20. The method of claim 9, wherein the bowing of the linearizing flexure linearizes a spring force for the film hinge.

* * * * *